Aug. 27, 1968   C. G. F. RICHARDS   3,398,763

BALL VALVE

Filed Sept. 10, 1965

United States Patent Office 3,398,763
Patented Aug. 27, 1968

3,398,763
BALL VALVE
Cecil Graham Francis Richards, Aspley, Brisbane,
Queensland, Australia, assignor to B. C. Richards
& Co. Pty. Ltd., Geebung, Brisbane, Queensland,
Australia
Filed Sept. 10, 1965, Ser. No. 486,357
Claims priority, application Australia, Sept. 11, 1964,
49,232/64
5 Claims. (Cl. 137—553)

ABSTRACT OF THE DISCLOSURE

A ball valve has a wear take-up mechanism on its sealing ring including coacting wedge-shaped grooves and corresponding protuberances between a take-up ring and a radial face of a rebate in the casing surrounding inlet or outlet. The take-up ring is rotated about its axis by take-up means, operable independently of the valve control means from outside the casing. The take-up means may have an indicator for the extent of wear on the sealing ring.

This invention relates to a ball-valve particularly suited to high-pressure use in large sizes.

A ball-valve essentially comprises a ball with the operative parts of its surface spherical and having an axial passage through it, and means for mounting the ball for rotation in a casing so that the passage is in line with a fluid passage in the casing or at right angles thereto for open and closed position of the ball-valve respectively.

One of the main advantages of such valves is that they can provide a "straight through" flow in open position, with consequent lack of turbulence, and that cleaning tools can be passed axially through the valve without obstruction.

It is desirable in a ball-valve to take up wear in the seats for the ball to ensure a non-leaking seal for the life of the valve, and to be able to adjust the sealing pressure on the ball.

It is an object of this invention to provide a take-up arrangement in which the alignment of the ball's axial passage with the fluid passage is not disturbed by such take-up adjustment.

It is a further object to provide a ball-valve with take-up means operable withohut any disassembly of the valve, i.e. from outside the valve casing.

It is a further object of the invention to provide such a value wherein the take-up is accurately adjustable and in which the degree of adjustment is positively indicated, so that a worn condition of the seal requiring its replacement can be detected from outside the casing.

In a ball-valve seal it is desirable that the sealing pressure on the ball, as well as being adjustable to a mean value to compensate for wear as described above, should also respond to pressure of fluid in the passage, so that with increased fluid pressure there is increased sealing pressure and the effectiveness of the seal is maintained.

It is a further object of the invention to obtain this result.

Figure 1:
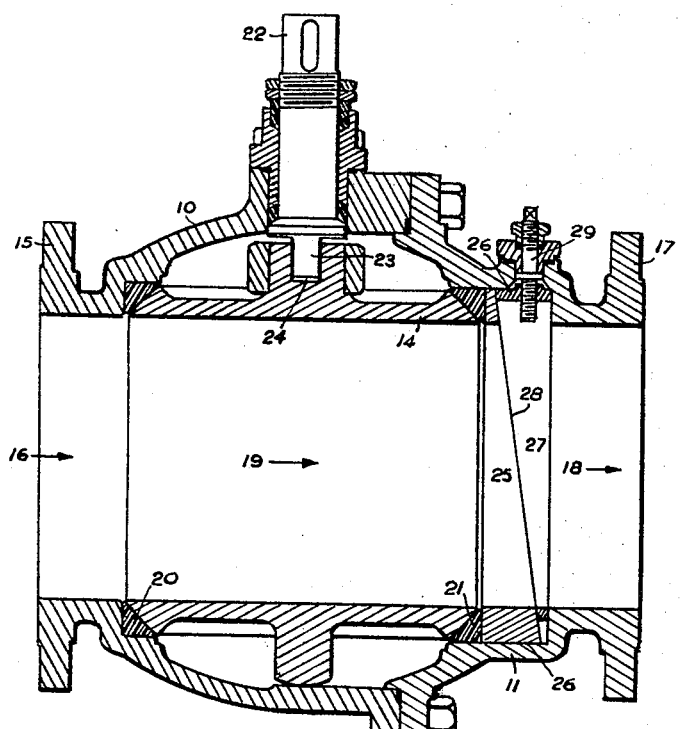
Figure 2:
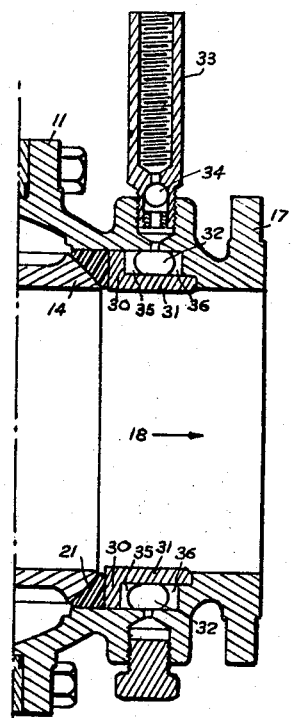
Figure 3:
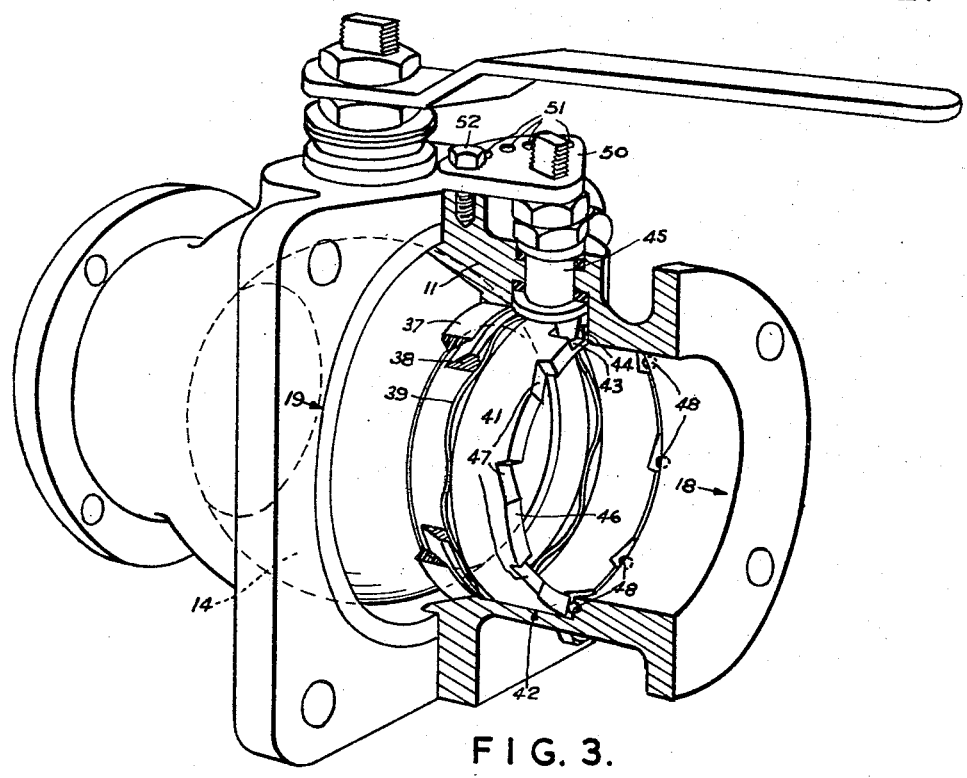

Various forms of the take-up means are explained by way of example with relation to the accompanying drawings, in which:

FIG. 1 is a longitudinal section through a ball valve showing one such take-up means, FIG. 2 is a part sectional view showing a second form of take-up means, and FIG. 3 is a partly broken away perspective view of a valve showing a third form of take-up means.

FIG. 1 shows a ball valve having a casing formed of a part 10 and a part 11 bolted together at outer flanges 12, 13 to complete the seating for a ball 14. Part 10 has an inlet flange 15 and a fluid passage 16, and part 11 an outlet flange 17 and a fluid passage 18.

The ball 14 has a diametral aperture 19, which in open position of the valve (as shown) is in line with the fluid passage 16 and 18, and of the same diameter, giving a straight-through passage.

The seating for the ball comprises polytetrafluor-ethylene sealing rings 20 and 21 surrounding the fluid passages 16 and 18, respectively, and shaped to bear on the spherical surface of ball 14.

The valve control means comprises a spindle 22 rotatably mounted through part 10 of the casing, with the usual pressure seals around it, and terminating in a flattened lower end 23 which lies slidably in a slot 24 on the upper part of ball 14. Rotation of spindle 22 turns the ball from "valve-open" to "valve-closed" position and vice versa.

Ring 21 is backed by a rigid backing ring 25 slidable axially in a recessed portion 26 in the passage 18 and ring 25 and passage 18 are coaxial and of the same internal diameter. A second ring 27 is mounted in recess 26 for transverse movement across passage 18 and abuts ring 25 on an inclined face 28.

Ring 27 is moved transversely by a captive screw 29 passing through part 11 of the casing, and being threaded into the ring 27. Transverse movement of ring 27, owing to the inclined contact face 28, moves ring 25 axially with respect to passages 16, 18 and so adjusts sealing ring 21 towards or away from ball 14.

The flat portion 23 of spindle 22 and the slot 24 in ball 14 allow longitudinal movement of the ball in "valve-closed" position, and also slight rotation about its center to equalize pressure on the seatings.

Thus adjustment of sealing ring 21 by backing ring 25 is transmitted, by movement of ball 14, to sealing ring 20 and pressure adjustment on both rings is obtained by movement of the single backing ring 25.

FIGURE 2 shows a part section of an alternative embodiment corresponding to the right hand side of FIGURE 1.

In FIGURE 2, the sealing ring 21 abuts a radial flange 30 on a backing ring 31, longitudinally slidable in an annular internal recess 32 in passage 18.

The recess 32 is fed with grease under pressure through a nipple 33 passing through the casing part 11 and having a non-return valve 34 therein. At each side of recess 32 behind the L-section ring 30, 31 are concave-faced C-section resilient sealing rings 35, 36. The pressure of the grease forces ring 31 and flange 31, 30 against sealing ring 21 and at the same time forces the inner horns of seals 35, 36 hard against the wall of recess 32 and the outer wall 31, thereby insuring no leakage of grease.

Movement of sealing ring 21 is transmitted through the ball to the inlet sealing ring (not shown) as explained with reference to FIGURE 1.

FIGURE 3 shows in perspective a ball valve partly broken away to show the details of a take-up means using a rotating ring and a modified sealing ring assembly.

The outlet sealing ring 21 of FIGURE 1 is replaced by a composite ring including a polytetrafluoroethylene sealing ring 37 contacting ball 14 and tapered radially inwards away from the ball, a metal backing ring 38 tapered radially outwards towards the ball, and a crimped metal spring 39. An axially-movable take-up ring 41 lies flush with ball aperture 19 and passage 18, in a peripheral recess 42 in passage 18.

Ring 41 has a recess 43 in its periphery, into which fits a projection 44 eccentrically carried by a rotary shaft 45 extending through the casing part 11, said shaft 45, projection 44, and recess 43 forming a take-up means.

The rear radial face 46 of ring 41 has evenly spaced circumferential wedge-shaped slots 47 machined across it, the floor of each slot sloping from one end to the other thus giving a groove of saw-tooth cross-section. At corresponding points on the radial face of recess 42 are hemispherical recesses each containing a ball 48 projecting into one of the slots 47.

Rotation of shaft 45 rotates ring 41 via eccentric projection 44 and recess 43, and balls 48 ride up on the sloping floors of slots 47, thus forcing ring 41 to the left to increase the sealing pressure on backing ring 38 and sealing ring 37.

The inlet sealing ring assembly (not shown) includes a sealing ring 37, backing ring 38 and spring 39 similar to those described, but spring 39 abuts the radial face of a recess around the inlet aperture instead of the face of a take-up ring 41.

As previously described in relation to FIGURE 1, movement of ball 14 equalizes the pressure on the inlet and outlet sealing ring assemblies. If ring 41 is moved back to the right, spring 39 around the inlet moves the ball 14 and again equalizes the pressure.

Owing to the tapered form of backing ring 38, the sealing rings 37 are forced outwards against the casing to give a tight seal against leakage around the outer surface of sealing ring 37, and also against ball 18 to prevent leakage across the surface of the ball.

The embodiment of FIGURE 3 has the advantage that it can be calibrated to give an indication when the maximum wear adjustment has been reached, and therefore when sealing rings 37 or ball 14 require replacement.

In prior take-up arrangements, the degree of wear could not be so indicated and had to be estimated by time of use, or inspected by dis-assembly of the valve.

For calibration, a plate 50 having an arcuate series of holes 51 concentric with shaft 45 is attached to the shaft, and a pin 52 screwing into the casing 11 and passing through any one of the holes 51, locks the shaft in one of a series of positions. When the last hole is reached the balls 48 are in the shallowest part of grooves 47 and no further adjustment is possible.

The balls 48 may be replaced by round-tipped pegs located in holes in the radial face of recess 42.

It will be noted that, in all three embodiments described, the adjustable sealing ring is backed by a rigid axially-movable backing ring. Since the metal-to-metal clearance between ball 14 and the casing may be made small, all embodiments may provide metal-to-metal fireseals when the sealing rings are burnt out.

Various changes and modifications may be made in the arrangements described without departing from the invention as claimed.

I claim:
1. A ball valve comprising a casing, a rotatable ball in said casing, said ball having a diametral aperture therein, said casing having fluid passages which extend axially relative to said ball for the flow of fluid to and from said ball through said casing, said casing having an internal annular recess which opens into one of said passages adjacent said ball, a sealing ring contacting said ball, a backing ring, an annular spring and a take-up ring located in succession between said ball and a radial face of said recess and axially movable in said recess, said backing ring and sealing ring having annular contact surfaces which are inclined with respect to the axis of said one passage, said backing ring having an internal surface of axial extent which opens into said one passage, coacting means including elongated spaced wedge-shape slots and corresponding protuberances between said take-up ring and said radial face, take-up means operable from outside said casing to rotate said take-up ring about the axis of said one passage whereby the take-up ring is moved axially in said recess to urge in turn the sealing ring axially against the ball, and valve control means for rotating said ball between open and closed positions, said take-up means and valve control means being operable independently of one another.

2. A ball valve as claimed in claim 1, including an indicator outside said casing to indicate the amount of take-up movement of said take-up ring and therefore said sealing ring.

3. A ball valve as claimed in claim 2, including locking means associated with said indicator to lock said take-up means in selected position.

4. A ball valve as claimed in claim 1, in which said protuberances each comprise a ball fitted in a hemispherical recess in said radial face and said wedge-shaped slots are each a cut out of saw-tooth section in said take-up ring.

5. A ball valve as claimed in claim 1, wherein said contact surfaces of the sealing ring and backing ring lie on a conical surface, which increases in diameter in a direction in said one passage away from said ball.

References Cited

UNITED STATES PATENTS

| 2,863,629 | 12/1958 | Knox | 251—188 X |
| 2,995,336 | 8/1961 | Usab | 251—163 |
| 3,064,938 | 11/1962 | Knox | 251—188 X |
| 3,261,483 | 7/1966 | Calabretta | 251—162 |
| 1,738,450 | 12/1929 | Ryan | 251—159 |
| 2,734,715 | 2/1956 | Knox | 251—171 |
| 3,038,693 | 6/1962 | Dumm | 251—171 |
| 3,254,873 | 6/1966 | Knox | 251—188 X |

WILLIAM F. O'DEA, *Primary Examiner.*

HAROLD W. WEAKLEY, *Assistant Examiner.*